United States Patent [19]

Wismer et al.

[11] 4,007,141

[45] Feb. 8, 1977

[54] OPAQUE, NON-PIGMENTED MICROPOROUS FILM AND PROCESS AND COMPOSITION FOR PREPARING SAME

[75] Inventors: Marco Wismer, Gibsonia; Jerome A. Seiner, Pittsburgh, both of Pa.

[73] Assignee: PPG Industries, Inc., Pittsburgh, Pa.

[22] Filed: Aug. 21, 1969

[21] Appl. No.: 852,055

Related U.S. Application Data

[63] Continuation-in-part of Ser. No. 632,392, April 20, 1967, abandoned.

[52] U.S. Cl. .............................. 260/2.5 B; 252/316; 260/2.5 N; 260/2.5 F; 260/29.6 NR; 260/33.6 R; 260/33.6 UA; 260/831; 260/901; 427/373
[51] Int. Cl.² .......................................... C08J 9/22
[58] Field of Search .................................. 260/2.5 B

[56] References Cited

UNITED STATES PATENTS

| | | | |
|---|---|---|---|
| 2,885,303 | 5/1959 | Kaplan | 260/2.5 B |
| 3,418,250 | 12/1968 | Vassiliades | 117/36.2 |
| 3,501,419 | 3/1970 | Bridgeford | 260/2.5 B |
| 3,516,941 | 6/1970 | Matson | 260/89.5 R |
| 3,615,972 | 10/1971 | Morehouse et al. | 260/2.5 B |
| 3,655,591 | 4/1972 | Seiner | 260/2.5 B |

*Primary Examiner*—Wilbert J. Briggs, Sr.
*Attorney, Agent, or Firm*—Frank J. Troy; Carl T. Severini

[57] ABSTRACT

A resinous composition for preparing opaque films which consists of a film-forming material in which there is dispersed discrete cellular particles. Each particle is composed of non-opaque, film-forming material, such as acrylic resins, and contains therein one or more cells, having an average diameter of less than 15 microns, which serve to scatter incident light rays. The particulate matter is easily dispersed in the film-forming material by means of conventional mixing procedures.

9 Claims, 1 Drawing Figure

U.S. Patent Feb. 8, 1977 4,007,141
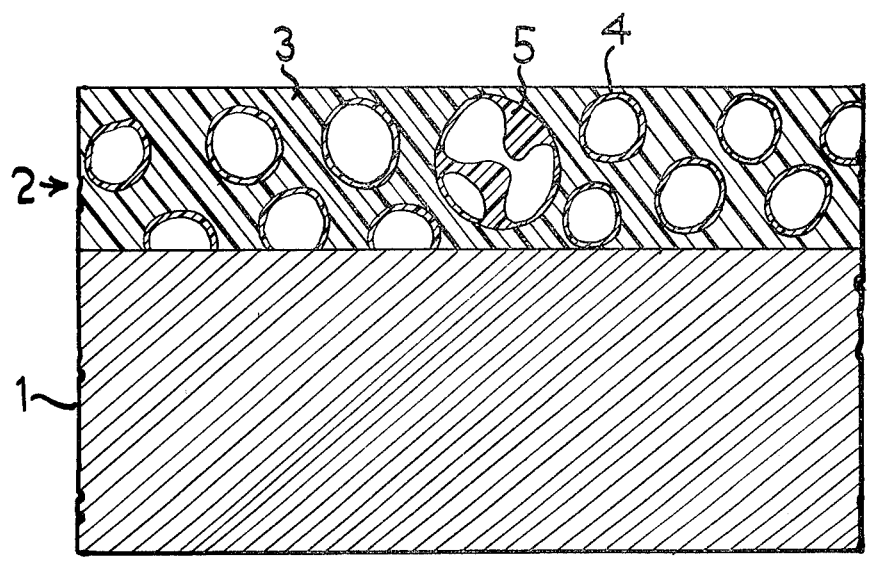
INVENTORS
MARCO WISMER
JEROME A. SEINER
BY
ATTORNEYS

OPAQUE, NON-PIGMENTED MICROPOROUS FILM AND PROCESS AND COMPOSITION FOR PREPARING SAME

CROSS-REFERENCE TO RELATED APPLICATION

This application is a continuation-in-part of copending application Ser. No. 632,392, filed Apr. 20, 1967, and now abandoned.

BACKGROUND OF THE INVENTION

Optical opacity, for example, "hiding" of a paint film, is a property which is of great importance in the coating industry where such films are employed to decorate and protect the substrate on which they are applied. In many such applications, such as those in the appliance industry, white finishes of high hiding and having good protective qualities are desired, and special effort has been expended in order to produce suitable coatings of this type.

The optical opacity of films is achieved either by absorption of the incident light or by scattering of the incident light or a combination of these two. Thus, black is opaque because it absorbs the light incident on it and white is opaque because it back-scatters the incident light. Light is either absorbed or scattered before it can reach the substrate. The ideal white coating, therefore, is one which has zero absorption and maximum scattering.

Opaque films have conventionally been prepared by adding pigment, such as titanium dioxide, to a film-forming material which would otherwise be colorless or transparent when cast in a film. The necessity for adding an opacifying agent obviously increases the cost of the resultant film. Moreover, the addition of such materials often causes the impairment of the physical properties of the resultant film.

More recently, processes have been described in the art for preparing opaque films which rely for opacity upon the presence of a large number of cells or voids in the film. One such method involves depositing a film from an emulsion, such as an oil-in-water or a water-in-oil emulsion. Another technique for obtaining such cellular films is by preparing an aqueous dispersion of a film-forming polymer containing a water-soluble organic solvent in an amount which is insufficient to dissolve the polymer. This aqueous dispersion is then cast as a film and water is evaporated, thereby causing entrapment of minute droplets of the organic solvent in the polymer. The film is then washed to dissolve the entrapped minute droplets of solvent and the film is dried.

Opaque films having such microscopic voids display improved hiding power over films utilizing pigments and, moreover, are less costly and possess improved physical properties. But despite the over-all utility of films produced according to this method, their use has been handicapped by the difficulties inherent in the preparation of the film-forming composition. When an emulsion technique is employed, for example, care must be taken in order to insure its stability, i.e., so that it will not break before it is used to deposit a film. This frequently requires the use of emulsifying agents. However, emulsifying agents which are then present in the film detract from the physical properties of the film, such as its water repellency, scrub resistance, etc.

More generally, the formation of microvoids according to conventional practice usually involves a spontaneous and non-controllable process. Consequently, wide variations in the size of the voids and their distribution in the film-forming material often result, with an accompanying decrease in both opacity and film characteristics.

In brief, it has not been possible according to any known procedures to produce an opaque, non-pigmented coating or film without employing relatively elaborate film-forming methods, as with the above-described techniques, or without foregoing desirable film characteristics, as has usually occurred with the use of pigments.

SUMMARY OF THE INVENTION

It has now been discovered that opaque films, having superior opacity and whiteness and other desirable properties, can be obtained from compositions prepared according to a very easily carried out process whereby there is distributed throughout a liquid resinous film-forming binder material particulate matter which contains one or more cells within each particle, the cells having an average size of from about 0.01 micron to about 15 microns.

In addition to obviating the necessity for elaborate techniques required for the preparation of present opaque, non-pigmented coatings, the compositions of this invention have several additional advantages. For instance, the cell size can be more easily controlled so that, if desired, the composition can be prepared utilizing particles of uniform diameter, thereby assuring uniform cell size in the film. Moreover, both prior to and after the combining of the components, the system is characterized by an over-all ease of handling, requiring no stringent or elaborate controls. The particulate cellular material, which can be conveniently utilized in the form of a free-flowing powder, is simply ground into, blended, or otherwise conventionally combined with the film-forming material. The resulting mixture presents the same ease of handling usually associated only with fully pigmented compositions.

The compositions of this invention are formed into films and dried by conventional techniques. By "drying" is meant producing a relatively hard, dry film; depending upon the film-forming material utilized, this may require only evaporation of solvents, or coalescence or chemical reaction resulting from oxidation or the application of heat or a curing agent may be required. Any such film-forming mechanism can be employed to produce films in accordance with the invention herein. When utilized as coating compositions, the compositions herein can be applied to numerous substrates, including, e.g., steel, aluminum, and other metals, as well as wood, plastic, paper, and the like. They may be coated onto such substrates by brushing, spraying, dipping, roller coating, knife coating, and the like, and air-dried, air-cured, vacuum dried, or baked at elevated temperatures.

Films prepared according to the simple process of this invention, having thicknesses ranging up to about 20 mils, display excellent properties, such as extreme opacity or hiding power, and may be utilized as coatings, for instance, as automotive finishes, appliance finishes, coatings for lighting fixture reflectors, and decorative coatings. Cross-linked coatings of this type are insoluble and infusible and are extremely tough and abrasion resistant. The coatings are especially useful in lighting fixtures since they almost completely reflect light rather than absorb it.

Microporous films of this invention, particularly those having an average cell size of less than 0.1 micron, are also useful in a variety of applications as free films. For example, they can be utilized as vapor or liquid permeation membranes. One such use for such permeation membranes is in desalinization processes.

BRIEF DESCRIPTION OF THE DRAWING

FIG. 1 shows a cross-sectional view of an opaque layer of a cured resin composition having distributed therein numerous discrete cellular particles. As shown, the substrate 1 has thereon, as a coating, a cured, opaque and substantially non-pigmented film 2 prepared according to the method of this invention. Distributed throughout the film-forming material 3 are numerous single-celled, air-filled particles 4 having an outside diameter of 0.5 microns and an average cell diameter of 0.3 microns. Multicellular particles 5 having an average particle size of 10 microns are also present, along with the single-celled particles, to scatter incident light and thereby provide an opaque film.

DESCRIPTION OF PREFERRED EMBODIMENTS

In accordance with the invention, opaque films are prepared from resinous compositions which comprise liquid resinous film-forming binder material and particulate cellular matter comprising discrete solid particles which contain therein cells having an average size between about 0.01 micron and about 15 microns, the particles being composed of a substantially non-opaque material.

The film-forming materials which may be used in the practice of this invention include any such material, many of which are well known in the art. Such materials must contain at least one film forming polymer. Such polymers include thermoplastic and thermosetting, synthetic and natural polymers.

The invention is useful in opacification of films made from film-forming materials which are substantially nonlight absorbing. Such materials form dried films which are clear or translucent; light-absorbing compositions which are black or dark in color are not ordinarily useable to provide films and coatings in accordance with the present invention.

Examples of film-forming materials useful in this invention include those prepared from cellulose derivatives, e.g., ethyl cellulose, nitrocellulose, cellulose acetate, cellulose propionate and cellulose acetate butyrate; acrylic resins, e.g., homopolymers and copolymers with each other or with other monomers of acrylic or methacrylic acid and their derivatives, such as methyl acrylate, methyl methacrylate, ether acrylate, ethyl methacrylate, butyl acrylate, butyl methacrylate, acrylamide, acrylonitrile, etc; polyolefins, e.g., polyethylene and polypropylene; polyamides, such as nylon, polycarbonates; polystyrene; copolymers of styrene and other vinyl monomers such as hompolymers and copolymers of vinyl acetate, vinyl chloride and vinyl butyral; homopolymers and copolymers of dienes such as polybutadiene, butadiene-styrene copolymers, and butadiene-acrylonitrile copolymers.

Condensation polymers may also be used, such as alkyd resins, which are obtained by the condensation of a polyhydric alcohol and a polycarboxylic acid. Examples of polycarboxylic acids which may be used to form the alkyd resin include phthalic acid, succinic acid, adipic acid, maleic acid, isophthalic acid, terephthalic acid, etc., which are reacted with polyhydric alcohols such as ethylene glycol, propylene glycol, glycerine, sorbitol, pentaerythritol, and the like. Epoxy resins may also be used as the film-forming material. Epoxy resins include the condensation products of bis-phenol and epichlorohydrin, epoxidized oils, the glycidyl ethers of glycerol, epoxylated "novolac" resins, etc. Phenolic resins, such as those obtained by the reaction of phenol and formaldehyde, may also be used, as can aminoplast resins derived from the reaction of a compound containing a plurality of —NH₂ groups (e.g., urea, melamine, guanamine or benzoguanamine) with an aldehyde or a substance acting as an aldehyde (e.g., formaldehyde, benzaldehyde, paraformaldehyde). In preparing aminoplasts, the aldehyde or its equivalent is usually dissolved in an alkanol, such as butyl alcohol, and at least a part of the N-methylol groups on the aminoplast are converted into

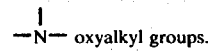

A preferred group of film-forming materials which may be used in the practice of this invention are carboxylic acid amide interpolymers of the type disclosed in U.S. Pats. Nos. 3,037,963; 3,118,853; 2,870,116; and 2,870,117, the disclosures of which are incorporated herein by reference. These interpolymers are prepared by forming an interpolymer of an unsaturated carboxylic acid amide, such as acrylamide or methacrylamide, with at least one other polymerizable ethylenically unsaturated monomer, and then reacting the interpolymer with an aldehyde, such as formaldehyde, in the presence of an alcohol, such as butanol.

Alternatively, such interpolymers can be produced by first reacting the unsaturated amide with an aldehyde and, if desired, an alcohol, to form an N-alkylol or an N-alkoxy-alkyl-substituted amide. The N-substituted amide then is interpolymerized with the other monomer or monomers, thereby producing interpolymers having the aforesaid recurrent groups without the need for further reaction. Such a method utilizing N-alkoxyalkyl-substituted amides is described in U.S. Pat. No. 3,079,434.

Advantageous properties are often obtainable by employing mixtures of the above amide interpolymer resins with other resinous materials, such as many of those mentioned herein. For example, nitrocellulose, polyethylene, alkyd resins, epoxy resins, aminoplast resins, and others can be utilized for this purpose.

Another preferred group of film-forming materials which may be used in the practice of this invention consists of interpolymers of hydroxyl-containing esters of unsaturated acids with at least one other polymerizable ethylenically unsaturated monomer. Such interpolymers are prepared, for example, by the free-radical initiated polymerization of a mixture of monomers comprising at least 2 percent by weight of a hydroxyalkyl ester of an ethylenically unsaturated carboxylic acid, generally having up to about 12 carbon atoms in the alkyl group, and at least one other ethylenically unsaturated monomer copolymerizable therewith. In many cases, more than one hydroxyalkyl ester is included in the interpolymer, and generally several monomers in addition to the hydroxyalkyl ester or esters are employed. Preferred hydroxyalkyl esters of ethylene glycol and 1,2-propylene glycol, i.e., hydroxyethyl acrylate and methacrylate, and hydroxypropyl acrylate and methacrylate, but there may also be employed similar esters of other unsaturated acids, for example, ethacrylic acid, crotonic acid, and similar acids having up to about 6 carbon atoms, as well as esters containing other hydroxyalkyl radicals, such as hydroxybutyl esters and hydroxylauryl esters, and the mono- or diesters of unsaturated dicarboxylic acids, such as maleic acid, fumaric acid, and itaconic acid, in which at least one of the esterifying groups is hydroxyalkyl, such as hydroxyethyl hydrogen maleate and bis(-hydroxypropyl) fumarate.

The monomer or monomers with which the hydroxyalkyl ester is interpolymerized can be any ethylenic compound copolymerizable with the ester. These include monoolefinic and diolefinic hydrocarbons, halogenated monoolefinic and diolefinic hydrocarbons, unsaturated esters of organic and inorganic acids, esters of unsaturated acids, nitriles, unsaturated acids, and the like. Examples of such monomers include styrene, butadiene-1,3,2-chlorobutene, alpha-methyl styrene, 2-chlorobutadiene-1,3, vinyl butyrate, vinyl acetate, dimethyl maleate, divinyl benzene, diallyl itaconate, and the like. Preferred comonomers are the alkyl esters of ethylenically unsaturated carboxylic acids, vinyl aromatic hydrocarbons, ethylenically unsaturated nitriles, and ethylenically unsaturated carboxylic acids. The specific comonomers most often employed are methyl methacrylate, ethyl acrylate, styrene, vinyl toluene, acrylonitrile, methacrylonitrile, methacrylic acid, acrylic acid, 2-ethylhexyl acrylate, butyl acrylate, butyl methacrylate, and lauryl methacrylate.

Films are usually produced from the above interpolymers of hydroxyalkyl esters by cross-linking these interpolymers with another material containing functional groups reactive with the hydroxyl group of the interpolymers, such as, for example, polyisocyanates and aminoplast resins.

Still other film-forming materials which may be used in the practice of this invention include, for example, naturally occurring materials such as casein, shellac and gelatin.

The particles which constitute the particulate matter employed in the invention are discrete, solid entities which contain therein one or more cells. The walls of each particle are composed of a material which is substantially non-opaque; i.e., the particle walls are transparent or translucent to incident light rays in order to enable the particle to act as a light scattering agent.

The overall size of the particles is relatively noncritical, but generally speaking, they should not have a size (measured by the maximum dimension) of greater than about 100 microns. The size of the particles depends in large part upon the type of particles, the number of cells in each, etc. For instance, monocellular particles ordinarily have an average size of from about 1 to about 10 microns, while multicellular particles have an average size of 3 to 30 microns or larger.

Substantially all of the cells or voids have diameters ranging from as low as about 0.01 micron up to about 30 microns, with the average cell size being up to about 15 microns. Preferably, the cells are less than about 5 microns, and an especially preferred diameter range is from about 0.01 micron to about 0.8 micron. Films prepared according to the process of this invention but having cell sizes outside of the above-disclosed diameter range do not function as efficient light scatterers and do not provide the excellent film characteristics as exhibited by the coatings herein disclosed.

The particles of this invention can be prepared having either continuous or non-continuous cell voids; e.g., the cells can be open (connected) or closed (unconnected). Since the opacity of the film if dependent upon the presence of a substantial number of cells, or voids, within the film itself, it is essential that the film-forming material be prevented from entering into the cells so as to completely fill them. Thus, when permeable or open-cell structured particles are utilized, a suitable non-penetrating film-forming material must be selected so as to allow the formation therein of a sufficient number of voids of the size described.

The cells or voids in the particulate matter, as those terms are used herein, refer to spaces within the particulate matter not containing solid or liquid matter after drying of the film. The cells (or voids) are most commonly filled with air, although any suitable gas or mixture of gases may be employed in place thereof. Thus, when reference is made to gas or air-filled cells, it should be clear that other gases, such as helium, nitrogen, carbon dioxide, dichlorodifluoromethane, and the like, are also contemplated as being within the scope of the invention. Similarly, the cells can also be prepared in a vacuum state, and these too are included. In certain cases gas-filled cells are provided in the particles as produced and these are combined with the binder material to form the composition used to make opaque films. In other cases, however, there are utilized particles with cells containing a volatile liquid or a sublimable solid (formed by encapsulation techniques, for instance) and these are combined with the binder. Upon drying, the volatile liquid or sublimable solid vaporizes, leaving gas-filled voids in the dried film.

The particulate matter of this invention can be prepared from any substantially non-opaque material which can be formed into cellular particles of the size and structure as described above and which retain this form during the drying of the film-forming material. Such particle-forming material encompasses virtually any natural or synthetic resinous material including, for example, substantially all of the materials described above.

That is, the particle-forming material can be prepared from materials such as cellulose derivatives, for example, cellulose acetate, cellulose acetate-butyrate, and cellulose acetate-propionate; acrylic resins, such as homopolymers and copolymers with each other, or with other monomers such as methylacrylate, methyl methacrylate, ethyl acrylate, ethyl methacrylate, butyl acrylate, butyl methacrylate, hydroxyethyl acrylate, hydroxypropyl methacrylate, acrylic acid, methacrylic acid, acrylamide and acrylonitrile; polyolefins, such as polyethylene and polypropylene; polyamide resins, such as those of the Nylon "66" type; polycarbonates; polystyrenes; copolymers of styrene and other vinyl monomers, for instance, acrylonitrile; vinyl polymers, such as homopolymers and copolymers of vinyl acetate, vinyl alcohol, vinyl chloride, and vinyl butyral; homopolymers and copolymers of dienes, such as polybutadiene, butadiene-styrene copolymers and butadiene-acrylonitrile copolymers; alkyd resins; polysiloxane resins; phenol-formaldehyde resins, urea-formaldehyde resins; and melamine-formaldehyde resins. All of these resins are film-forming and can be hardened or cured to a substantially non-opaque material and, therefore, are capable of forming discrete cellular particles capable of scattering light.

Natural resinous materials are also included within the scope of this invention for the preparation of the particulate matter, including soybean protein, zein protein, alganates, and cellulose in solution, and cellulose xanthate or cuprammonium cellulose. Inorganic film-forming substrates such as sodium silicate, polyborates and polyphosphates, are also contemplated as being within the scope of the above term.

The particulate matter of this invention can be prepared by various methods, including microencapsulation techniques as well as processes which require the use of blowing agents. Encapsulation methods are often especially suitable, and can be used to provide particles with either gas-filled cells or cells containing a volatile liquid or sublimable solid. A typical process is disclosed, for example, in U.S. Pat. No. 3,173,878, the disclosure of which is incorporated herein by reference. Polymeric microcapsules are produced by first creating a dispersion of an aqueous or other polar solvent solution in a solution of a hydrophobic encapsulating polymer in a non-aqueous non-polar solvent liquid. The polar or aqueous solution is present in the form of colloidal droplets which constitute the disperse phase, with the solution of the polymer constituting the continuous phase. Upon adding a second non-aqueous non-polar liquid, miscible with the polymer solution but in which the polymer is itself insoluble, the polymer is caused to precipitate around the droplets of the aqueous or polar solvent solution to form the polymeric microcapsules. These particles are suspended as tiny polymeric bodies in an equilibrium mixture of the added liquid and the continuous phase liquid.

As is common to most conventional encapsulation methods, such particles are then separated and gradually insolubilized and hardened by washing with successive liquid mixtures, each comprising intermixed solvent and non-solvent for the polymer, to form, upon drying, a finished product consisting of liquid filled microcapsules.

The liquid is usually prevented from being released through the pores of the polymeric wall material of the capsule, according to such methods, by means of various techniques, such as, for example, rapid performing of the gelation step. In the present invention, however, it is essential that the particles, when prepared according to such a method, release the liquid prior to or during the curing or hardening of the film-forming material in which the particles have been dispersed. Otherwise, a cellular film will not result and the cured film will be non-opaque. Thus, for the purposes of the present invention, the capsules are prepared to allow the timely release of the encapsulated fluid and the production of gas-filled microcapsules.

Particulate matter of this invention can be prepared containing a liquid, as described above, in order to give the particles more density, so that they can be more readily dispersed in the film-forming material. For example, capsules containing volatile liquids such as toluene or xylene are suitable for such use. Upon curing or drying of the film-forming material, in which the particles are dispersed, the liquid is released from the capsules to provide a film having the desired properties of opacity.

Similarly, microencapsulation techniques may be utilized which require or are most amenable to the encapsulation of solid particles. Here it is only necessary to use a solid which can sublime, i.e., be transformed directly to the vapor state without passing through the liquid phase, within a suitable temperature-pressure range. Such encapsulated solid particles can then be utilized as the partculate matter of this invention by dispersing them in the film-forming composition, applying such composition to a substrate, and curing or drying the composition to also cause the solid material within the capsules to sublime. The resultant cured or hardened film is thereby characterized by a cellular structure and is, accordingly, opaque.

A specific process for the preparation of unitary and discrete single-celled particles having a thin, strong skin, being substantially spherical in shape and which are substantially free from holes is disclosed in U.S. Pat. No. 2,797,201, the disclosure of which is incorporated herein by reference. In such technique, a solution comprising a volatile solvent having dissolved therein film-forming material and a latent gas is subdivided into droplets and the droplets are then subjected to a drying temperature at which the solvent is volatized and a hole-free tough surface skin is formed on the particles, and at which the latent gas is converted into a gas. In this way, gas is liberated within the particle coincident with its formation and is trapped beneath the surface skin of the particle, and either forms a hollow space there within or finds its way into a hollow space otherwise formed therein and through its presence there tends to prevent collapse of the particle walls under pressure of the atmosphere. The concentration of the solution of film-forming material, according to this technique, is not ordinarily critical but for the purposes of the present invention it is usually required or preferred to employ low concentrations since the smallest particles are formed from dilute solutions.

A suitable apparatus for the preparation of the abovedescribed particles is disclosed in U.S. Pat. No. 3,230,064, the disclosure of which is incorporated herein by reference. Such apparatus introduces the feed material, that is, the solution comprising the volatile solvent having dissolved therein film-forming material and latent gas, near the bottom of a conventional furnace or spray drying device into an ascending column of hot furnace gases. The feed material is admitted in subdivided form and is entrained in an upward moving, hot, gaseous stream. By such method, it is possible to prepare the particulate matter of this invention within the required narrow particle size range, that is, of a size less than 15 microns average diameter.

Another method widely utilized in the art for producing cellular particulate matter comprises the heat curing, while falling freely through space, or being conveyed by gas stream, of a granule or liquid droplet of a material capable of condensing to a thermosetting resin while concomitantly liberating a gas. Typical materials for preparing such particles, for example, are hexamethylenetetramine and phenol. A more detailed description of this technique is described in U.S. Pat. No. 2,929,106, the disclosure of which is incorporated herein by reference.

A method for preparing multicelled particles for employment as the particulate matter of this invention is disclosed in the *Society of Plastics Engineers Journal*, Volume 17, No. 3, March 1961, pages 249–251, the disclosure of which is incorporated herein by reference. Here, any resinous composition that can be foamed is introduced under pressure into a stream of hot gases in a gas turbine generator to form smokes consisting of spherical, foamed plastic particles having numerous cells therein. Powders of these particles can be obtained using this smoke making process by means of placing particle collection equipment in the path of the smoke; the powder thus constituting particulate matter for utilization as herein disclosed. Alternatively, the smoke can be directly absorbed into a liquid, a paint vehicle or other film-forming material or the like, to completely avoid the necessity of preparing a powdered form of the smoke particles.

Numerous processes are similarly available for the production of inorganic cellular particles, such as the technique disclosed in U.S. Pat. No. 2,978,340, the disclosure of which is incorporated herein by reference. Here there is described a method for preparing discrete, hollow glass spheres from a synthetic mixture of a siliceous material, a water desensitizing agent, and a compound which liberates a gas at a fusion temperature for this mixture. The process consists of subjecting particles of this mixture to an elevated temperature for a time necessary to fuse the particles and cause expansion of the particles into spheres. Additional information regarding the preparation of glass particles may be found in U.S. Pat. Nos. 3,030,215 and 3,129,086, the disclosures of which are also incorporated herein by reference.

As described above, a most signifcant advantage of the process of this invention is the comparative simplicity with which the film-forming composition may be formed. For example, the particulate matter as prepared above can be simply mixed into a paint vehicle or other form of film-forming material and the combination applied to a substrate and hardened or cured to form a resultant opaque film. No unusual or elaborate steps are required to obtain a satisfactory film-forming composition, or to make a free film or coating therefrom.

The amount of particulate matter employed in the composition varies, depending, for instance, upon the opacity and particular application. Preferably the particulate matter is present in amounts sufficient to provide a cellular volume which constitutes from about 30 percent to about 90 percent of the total volume of the film-forming material and particulate matter, an especially preferred range being a cellular volume of from about 40 percent to about 70 percent of this total volume. By "cellular volume" is meant the total volume of the voids or cells having the specified cell size.

Ordinarily the films produced using the cellular particles as the only opacifying agent are opaque and white. Color forming material such as dye or pigment can be included in the film-forming composition, if desired, either in the wall material of the particles or in the film-forming material, to produce colored films. Only small amounts of dyes or pigments are employed for this purpose. It is often advantageous to employ particulate matter, as disclosed above, in combination with conventional pigments such as, e.g., titanium dioxide, carbon black, talc, barytes and the like, as well as conventional color pigments, such as e.g., cadmium yellow, cadmium red, phthalocyanine blue, chromic yellow, toluidine red, and the like. By blending these dissimilar opacifying substances, it is possible to obtain film characteristics, e.g., whiteness, utilizing much lower amounts of pigment. However, when pigment is thus utilized, the amount is less than is normally required to opacify the film-forming material used, i.e. less than the amount of pigment required to provide an equivalent degree of opacification of such a film in the absence of the cellular particles. This is especially valuable where the specific pigment employed is of high cost or has other undesirable features when employed in higher amounts.

Thus, the important aspect of the invention is the use of the cellular particles described in place of all or part of the pigment which would otherwise be required to opacify a dried free or adherent film to the extent desired. Opacification of the dried film is obtained in this manner despite the fact that the cellular particles are themselves non-opaque, and even though the composition containing the binder and the particles may be non-opaque.

The examples which follow serve to further illustrate the invention, but should not be construed as imposing limitations thereon. All parts and percentages are by weight and are based upon non-volatile solids content, unless otherwise indicated.

EXAMPLE 1

Particulate matter consisting of discrete polyamide particles as a 20 percent emulsion in water, the particles having cell diameters of about 1 micron, was utilized according to this invention in preparing opaque, non-pigmented films. The particles were made of nylon (polyamide from hexamethylenediamine and adipic acid) and contained xylene within the particle cells to enable them to be more readily dispersed in the film-forming material.

A polyvinyl acetate latex composition, consisting of 75 percent of vinyl acetate and 25 percent of dibutyl maleate, served as the film-forming material. The latex composition had a pH of 4.0 to 5.0, a viscosity (Brookfield) of 500 to 1000 centipoises at 77° F., and contained 55 percent solids in water.

The above two components, in amounts of 116 grams of particulate matter emulsion and 12 grams of latex, were added to a 250 milliliter flask equipped with a stirrer. The materials were blended well for about 10 minutes, following which a 6 mil film of the mixture was drawn onto a 9 by 12 inch glass plate which had previously been cleaned with toluene and acetone. The coated glass plate was air dried at room temperature for about 2 hours. The hardened film obtained contained cells from the evaporation of the xylene; it was white and displayed excellent hiding.

EXAMPLE 2

An opaque, non-pigmented film was prepared according to the procedure of Example 1, utilizing substantially the same materials, except that the polyamide particles had an average cell diameter of about 25 microns. The particulate matter emulsion, in an amount 116 grams, was blended for about 30 minutes with 12 grams of the polyvinyl acetate latex composition and the resulting product was then drawn in a 3 mil wet thickness onto a 9 by 12 inch glass plate previously cleaned with toluene and acetone. The coated plate was air dried at room temperature for about 2 hours. The tack-free, microporous film obtained was uniformly opaque.

EXAMPLE 3

Particulate matter suitable for use in the invention was prepared by heating 500 grams of water and 5 grams of acacia gum to 80° to 85° C. with stirring. A solution of 20 grams of epoxy resin ("ERL-2772", a reaction product of Bisphenol A and epichlorohydrin having an epoxide equivalent of 175 to 190) and 2 grams of ethylene diamine was heated to 75° C. and slowly added to the above prepared aqueous over a 20 minute interval. The temperature was controlled at 85° C. during addition. Heating at 80° to 85° C. was continued for 2 hours and the mixture was then allowed to cool to room temperature after which a two-layered product was obtained, the top layer consisting of the particles.

The particles were then washed with water and blended with a polyvinyl acetate latex substantially the same as that utilized in Example 1. The thick, homogeneous product of the blend was then drawn onto a glass plate (9 × 12 inches) in a 6 mil wet film thickness and air dried at room temperature over about a two hour period. The resulting microporous film was uniformly opaque.

Numerous other particulate matter compositions and techniques, as well as a wide variety of other film-forming materials, can be utilized according to the teachings of this invention. For example, particulate matter in the form of hollow, hole-free particles can be prepared from a polyvinyl alcohol solution according to the procedure disclosed in U.S. Pat. No. 2,797,201. The particles formed thereby are substantially globular in shape, and can be dispersed, as above, in an acrylic resin comprising a copolymer of methyl methacrylate, lauryl methacrylate and methacrylic acid. Films cast from such mixture are completely white upon drying.

Similarly, and as noted above, multicellular particles prepared from phenol-formaldehyde resins can be prepared and utilized in the form of a powder and then combined with any of a number of various film-forming materials, such as an epoxidized polyester resin in a typical solvent such as isopropyl acetate. Additionally, any of the single-celled or multicelled particles described can be utilized either in combination with or individually in any of the film-forming materials or combinations thereof.

In accordance with the above description of the invention, the resinous composition herein disclosed can be readily used to form either as a free film or an adherent coating on any desired substrate, such as, e.g., steel, aluminum, wood, glass, plastic, and the like. This is possible since the particulate matter utilized herein is completely independent of the film-forming material. That is, the discrete, hollow particles can be blended or mixed into any desired substantially non-opaque coating composition to produce an opaque film.

According to the provisions of the patent statutes, there are described above the invention and what are now considered to be its best embodiments. However, within the scope of the appended claims, it is to be understood that the invention can be practiced otherwise than as specifically described.

We claim:

1. A resinous coating composition which upon drying forms a substantially continuous, highly opaque film, said composition comprising:
  a. liquid resinous film-forming binder material consisting essentially of at least one film-forming polymer which is substantially non-light absorbing, and
  b. dispersed in said binder material, particulate matter comprising discrete solid particles which contain therein one or more cells, the cells in said particulate matter having an average size between about 0.01 micron and about 15 microns, the particle walls having pigment incorporated therein and being composed of a substantially non-opaque material.

2. The composition of claim 1 wherein the average size of the particle cells is between about 0.01 micron and about 0.8 micron.

3. The composition of claim 1 wherein the substantially non-opaque material of the particle wall is a thermoplastic or cured thermosetting resinous organic polymer composition.

4. The composition of claim 3 wherin the particle wall is a cured thermosetting resinous organic polymer composition.

5. The composition of claim 1 wherein particulate matter is present in the composition in amounts such that the cellular volume is from about 30 percent to about 90 percent of the total volume of (a) and (b).

6. The composition of claim 1 wherein the cells in said particles contain a volatile liquid or a sublimable solid.

7. A cellular, opaque, substantially continuous film comprising a dried resinous composition which comprises:
  a. resinous film-forming binder material consisting essentially of at least one film-forming polymer which is substantially non-light absorbing, and
  b. dispersed in said binder material particulate matter comprising discrete solid particles which contain therein one or more cells, the cells in said particulate matter having an average size between about 0.01 micron and about 15 microns, the particle walls having pigment incorporated therein and being composed of a substantially non-opaque material.

8. The composition of claim 7 in which said particulate matter is present in the composition in amounts such that the cellular volume of from about 30 percent to about 90 percent of the total volume of (a) and (b).

9. An article comprising a substrate having as an adherent coating thereon the film of claim 7.

* * * * *